United States Patent [19]

Whitman

[11] Patent Number: 4,976,034

[45] Date of Patent: Dec. 11, 1990

[54] DEVICE FOR REMOVING RINGS FROM FINGERS

[76] Inventor: Anthony T. Whitman, 5 Redgate Rd., Tyngsboro, Mass. 01879

[21] Appl. No.: 377,947

[22] Filed: Jul. 11, 1989

[51] Int. Cl.⁵ .......................... B27B 3/28; B25F 3/00; B26B 7/00; B23D 45/16
[52] U.S. Cl. ...................................... 30/370; 30/124; 30/277.4; 30/388
[58] Field of Search ................. 30/128, 369, 371, 372, 30/373, 388, 124, 277.4, 370; 29/8, 10, 246; 320/2; 81/436, 63.1

[56] References Cited

U.S. PATENT DOCUMENTS

| | | | |
|---|---|---|---|
| 4,611,585 | 9/1986 | Steidle | 30/124 |
| 4,756,085 | 7/1988 | Lebessis | 30/277.4 |
| 4,829,229 | 5/1989 | Nakamura et al. | 320/2 |
| 4,835,410 | 5/1989 | Bhagwat et al. | 320/2 |
| 4,843,298 | 6/1989 | Brauch et al. | 30/388 |
| 4,857,702 | 8/1989 | Cafaro | 320/2 |
| 4,864,730 | 9/1989 | Weiss | 30/277.4 |

FOREIGN PATENT DOCUMENTS 263942 1/1989 Fed. Rep. of Germany ........ 30/388

Primary Examiner—Douglas D. Watts
Assistant Examiner—Paul M. Heyrana, Sr.
Attorney, Agent, or Firm—T. M. Gernstein

[57] ABSTRACT

A device for removing a ring from a patient's finger includes a motor driven saw blade that is actuated when a lever and a handle are brought towards each other. The motor driven saw blade cuts the ring so it can be removed from the patient's finger. One embodiment of the device includes two saw blades that are movable with respect to each other so that once a ring is cut, a gap will be defined and an opening element can be inserted between the two saw blades to widen that gap by forcing the saw blades apart. Since the saw blades are in contact with the ring, forcing them apart will widen the gap and permit the ring to be removed.

5 Claims, 2 Drawing Sheets 4,976,034

DEVICE FOR REMOVING RINGS FROM FINGERS

TECHNICAL FIELD OF THE INVENTION

The present invention relates to the general art of hand power tools, and to the particular field of hand tools used in medical procedures.

BACKGROUND OF THE INVENTION

Many people, through accident or other untoward event, have had the unfortunate and painful experience of having their hands and fingers swell rapidly. A sudden and violent blow to a finger or an infection, may result in such swelling, for example.

If the person is wearing a ring, such swelling may cause extra pain, and the ring may interfere with any medical procedure which will be undertaken with regard to the patient. Thus, the ring must be removed from the patient's finger.

However, in such an instance, removal of the ring can, itself, be an extremely painful procedure. Additionally, in some cases, ring removal should be as rapid as possible. Often, speed and comfort cannot be reconciled thereby subjecting the patient to further discomfort.

While the present inventor is aware of devices for removing finger rings, such as disclosed in U.S. Pat. No. 1,867,342 to B. Wieg, none of these devices operate as fast as necessary for a patient's comfort. It must be remembered that the patient may be in severe pain, and thus speed can be extremely beneficial.

Furthermore, devices, such as the Wieg device, require manual manipulation of the device to cut the ring. Such manual manipulation may cause the cutting device to move thereby causing further pain as the operator manually manipulates the device during the cutting procedure. Such manual manipulation is also slow.

Accordingly, there is a need for a device for removing rings from fingers that will operate rapidly and can remain steady during the cutting procedure.

While devices such as the Wieg device can cut a ring, it has been observed that if the finger is extremely swollen, simply cutting the ring will not be sufficient to permit removal thereof from the finger. The ring must be opened to permit complete removal. Such opening may require that the ring be cut again at a location spaced from the first cut, or be pried open at that cut.

A second cutting operation will simply slow the process down and can inflict still more pain on the patient. However, a prying operation may inflict still greater pain since the ring being cut and now contains sharp edges from the first cut that may cut into the already painful finger during the prying operation.

Devices, such as the Wieg device, that require the cutting tool to be removed and replaced by an opening tool thus not only slow the process, but may subject the patient to additional pain as the cutting tool is removed and replaced by a separate ring opening tool.

Therefore, there is a need for a ring cutting tool that will not only rapidly cut a ring from a person's finger, but will do so in a manner that permits the ring to be completely removed without subjecting the patient to pain that might be caused by contact between his finger and the sharp edges of the cut ring.

OBJECTS OF THE INVENTION

It is a main object of the present invention to provide a device for removing a ring from a finger in a rapid and steady manner.

It is another object of the present invention to provide a device for removing a ring from a finger in a rapid and steady, safe manner that permits complete removal of the ring without subjecting the patient to being contacted by the sharp edges of the cut ring as the ring is being pried open.

SUMMARY OF THE INVENTION

These, and other, objects are achieved by a device for removing rings from fingers that includes a powered motor that drives a saw to rapidly cut the ring. The device also includes two blades that are movable away from each other once the ring is cut.

By having two movable blades, the ring can be pried open by moving the blades away from each other. The blades, that are already in place on the cut ring, can be used as the prying means. Thus, the cutting device need not be removed and replaced by a prying means thereby speeding up the process and obviating the need to subject the patient to the further pain associated with the removal of a cutting device and replacement of such cutting device with a prying device. The process is thus expedited.

DETAILED DESCRIPTION OF THE PREFERRED EMBODIMENT OF THE INVENTION

Figure 1:
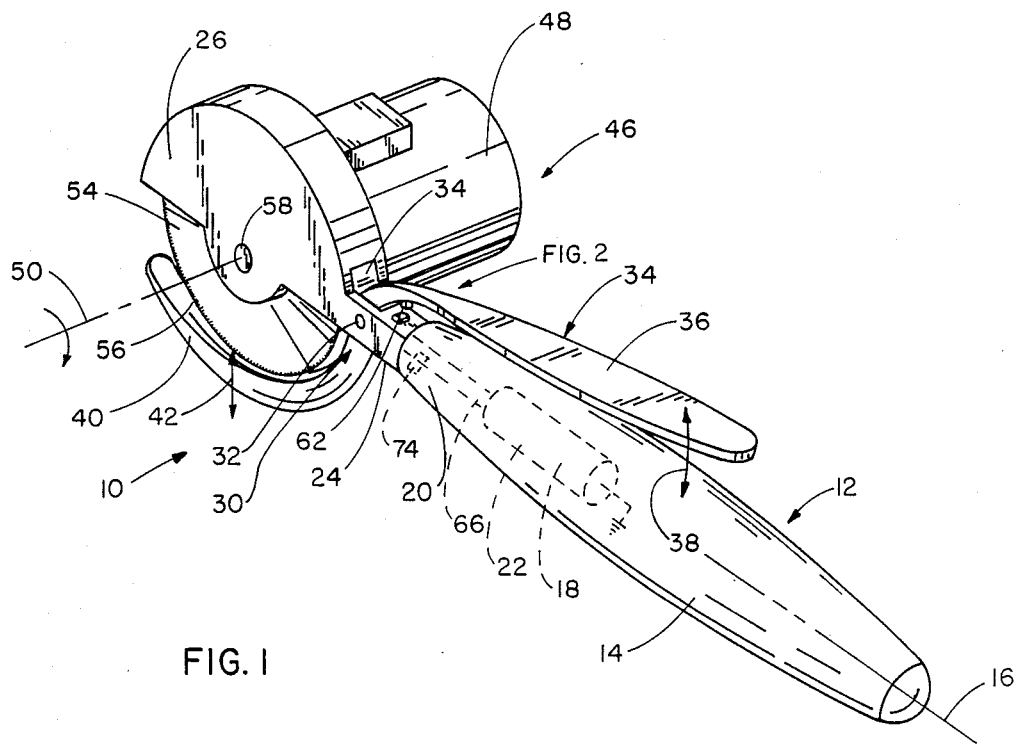
FIG. 1 is a perspective of the ring cutting device of the present invention.

Shown in FIG. 1 is a device 10 for removing a ring from a person's finger. The device 10 includes a handle assembly 12 that is held by the operator during the ring removal process. The handle assembly 12 includes a handle element 14 that has a longitudinal axis 16 and a battery chamber 18 defined therein. The handle assembly includes a cover 20 that slides covers the battery chamber to retain batteries, such as rechargeable battery 22, in place in that chamber. The chamber 18 is defined in a skeletal structure 24, or the like.

A blade covering hood 26 is attached to the skeletal structure to be aligned with the longitudinal axis 16 and to form an extension of the handle assembly 12. The hood protects both the patient and the operator from debris that may be associated with the ring-cutting operation. The further function of the hood will be evident from the ensuing discussion.

A pivot means 30 is located at the intersection of the hood assembly and the skeletal structure, and includes a pivot pin 32 which extends transverse to the longitudinal axis 16 across an opening 34 in the hood and in the skeletal structure. The function of the pivot means 30 will be evident from the ensuing discussion.

A lever assembly 34 is mounted on the handle assembly adjacent to the hood element via the pivot means 30, and includes a body 36 which extends in the direction of the longitudinal axis 16 and is mounted to move toward and away from the handle in the direction indicated by double-headed arrow 38. The lever assembly further includes a base element 40 located adjacent to the hood element to move toward and away from that hood element as indicated by double-headed arrow 42 as the handle body moves. A neck portion 44 connects the base and the body and is pivotally attached to the skeletal frame by the pivot pin 32 to permit the aforediscussed pivotal movement of the lever assembly.

The base element 40 is a thin, but strong material, such as a metal or the like, that is inserted between the ring and the finger to grasp the ring for the cutting operation. The thinner the base the better as this insertion will causes some discomfort to the patient.

It is noted that the above-mentioned pivotal movement really moves the handle assembly towards the lever assembly rather than the lever assembly towards the handle assembly. While the relative movement is the same, the practical effect is that the ring-supporting base element remains stationary with respect to the ring while the hood of the handle assembly moves toward the ring. This prevents discomfort to the patient while permitting the grasping of the ring.

The device 10 also includes a motor assembly 46 mounted on the handle assembly to extend transverse to the longitudinal axis 16. The motor assembly includes a motor 48 having a drive shaft (not shown in FIG. 1) that extends essentially perpendicular to the longitudinal axis 16. The drive shaft rotates about an axis of rotation 50 and rotates in a plane that also contains the longitudinal axis 16. The motor is mounted on the handle assembly and thus moves therewith during the aforementioned pivotal movement. The motor is any suitable small motor that is capable of producing a high rotational rate for the drive shaft.

A saw blade 54 having a cutting edge 56 is mounted for rotational movement about the rotational axis 50 in the hood 26. The saw blade 54 is mounted on a driven shaft 58 which is drivingly coupled to the motor drive shaft to drive the saw blade rotationally in a manner that will cause the cutting edge thereof to cut through a ring.

Figure 2:
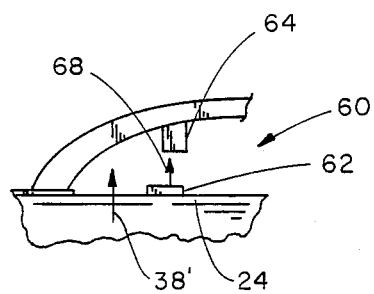
FIG. 2 is a schematic of an operating switch assembly of the ring cutting device.
Figure 3:
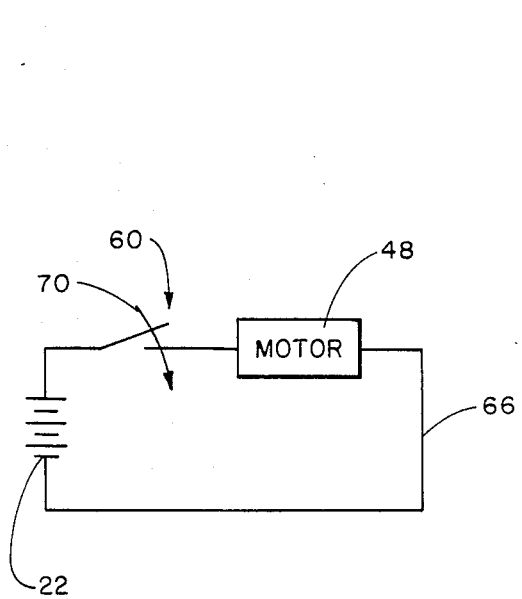
FIG. 3 is a schematic of a wiring diagram of the motor and power circuit used in the ring cutting device shown in FIG. 1.

As shown in FIGS. 2 and 3, the motor 48 is driven from batteries 22 via a switch means 60. The switch means 60 includes a push button 62 mounted on the handle assembly and a push button activating projection 64 mounted on the lever assembly. As the handle assembly moves upwards toward the lever assembly during the pivotal movement thereof, as indicated in FIG. 2 by the double-headed arrow 38', the projection 64 will contact the push button 62 thereby closing the circuit, which includes leads 66, to provide power from the batteries to the motor. The movement of the projection as a result of the movement of the handle assembly is indicated in FIG. 2 by arrow 68, and the closing movement of the push button is shown in FIG. 3 by the arrow 70.

Figure 4:
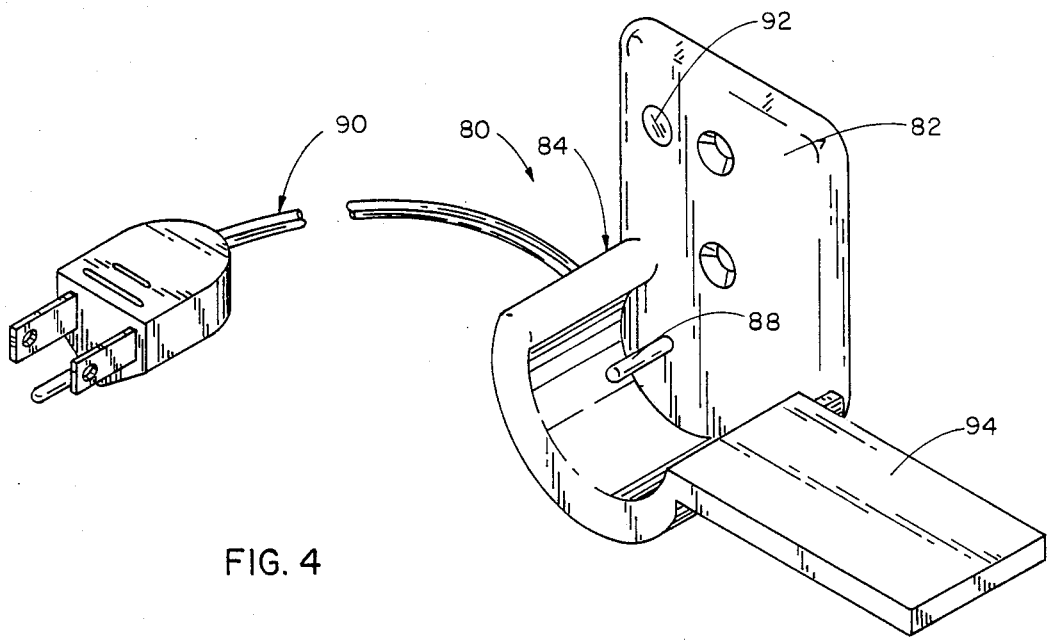
FIG. 4 is a perspective of a wall mountable recharging unit for use with the ring cutting device shown in FIG. 1.

The device 10 also includes a battery charging means 74 which is connected to a source of utility power via a lead, such as lead 78 and a wall mountable battery charger unit 80, best shown in FIG. 4. The battery charger system is conventional and thus will not be further discussed, as those skilled in the art will understand what is necessary to include such a system in the device 10 based on the disclosure herein. The unit 80 includes a base 82 that is mountable on a wall, or other such structure, and a cradle 84 in which the device 10 is supported when not being used. The cradle includes an arcuate base 86 which supports the motor 48 so that an electrically conductive prong 88 can be received into a battery charger circuit outlet. The prong 88 is connected to a source of utility power via a cord 90, and supplies such utility power to the charging circuit in the usual manner. An indicator 92 is also electrically connected to the circuit to indicate that the charging circuit is properly connected and is properly operating.

The unit 80 also includes a support shelf 94 that supports the handle assembly during storage and charging.

The device 10 is operated by inserting the base 40 between the ring and the patient's finger, and drawing the handle assembly up to the lever assembly thereby forcing the saw blade down into contact with the ring. This movement forces the projection 64 into contact with the switch 62 thereby depressing it and sending power to the motor 48. Once powered, the motor rotates the saw blade, and continued relative movement of the handle and lever assembly brings the saw blade into contact with the ring, which then permits the rotating saw blade to cut the ring. The location of the base 40 between the saw blade and the patient's finger prevents that blade from contacting the finger.

As mentioned above, simply making one cut in a ring may not be sufficient to permit complete removal of the ring, and that cut ring may have to be pried apart or cut again. If the ring is to be cut again, the above-discussed procedure is simply repeated at a location spaced from the first location.

However, an alternate procedure is achieved using an alternative embodiment of the device. The alternative embodiment includes the same handle assembly and lever assembly as above discussed, and thus these elements will not be described again.

Figure 5:
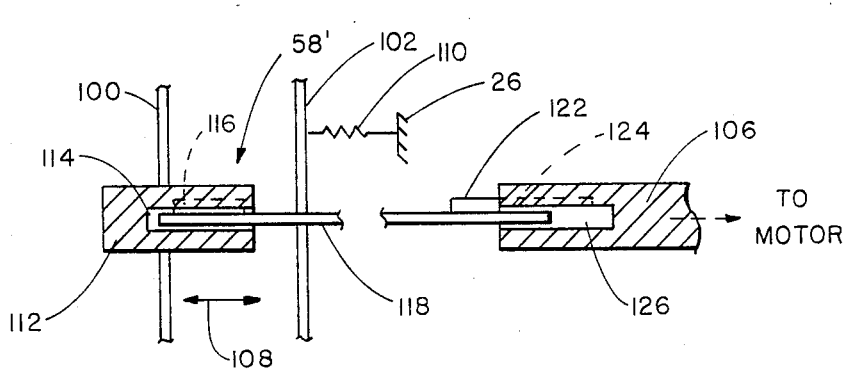
FIG. 5 is a schematic of the ring cutting device having two movable blades in the initial ring-cutting position.
Figure 6:
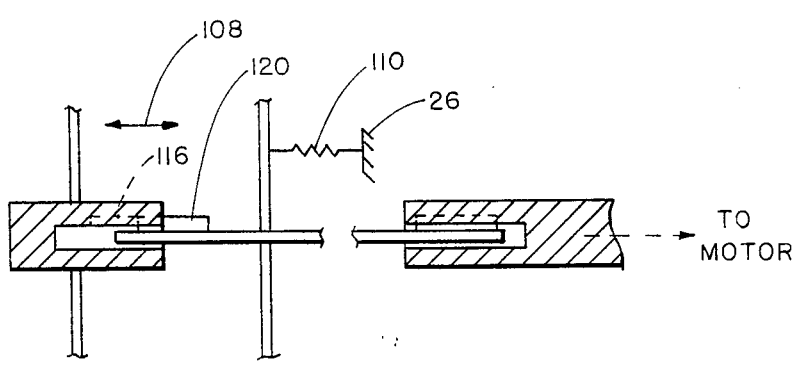
FIG. 6 is a schematic of the ring cutting device having the two movable blades in the ring-opening position.

However, as shown in FIGS. 5 and 6, the alternative device includes two saw blades 100 and 102, both of which are mounted on an extendable mounting 58' which is drivingly connected to a drive shaft 106 of the motor unit for rotation as above discussed. These saw blades 100 and 102 are movable toward and away from each other as indicated in FIGS. 5 and 6 by the double-headed arrow 108, with the blade 102 being biased toward the blade 100 by a biasing means, such as a spring 110 connected to the hood 26.

The saw blade 100 is fixedly mounted on a first element 112 that includes a bore 114 extending along the axis 50, and has a keyway 116 defined therein adjacent to the bore. The saw blade 102 is fixedly mounted on a second element 118 which fits into the bore and which includes a key 120 that is received in the keyway 116 to lock the elements 112 and 118 together in a driving connection so that rotation of one element is transmitted to the other element whereby the two saw blades 100 and 102 will rotate together. The bias of the spring 110 will force the two blades toward each other into the position shown in FIG. 5 for a ring cutting operation. The second element 118 also includes a key 122 on the other end thereof which is received in a keyway 124 of the motor drive shaft 106. The motor drive shaft also includes a bore 126 in which the second element 118 is received. The key 122 in the keyway 124 drivingly connects the second element 118 to the drive shaft so that rotation of the drive shaft under the influence of the motor 48 causes both of the saw blades to rotate.

Operation of the alternative form of the ring cutter is understood by reference to FIGS. 5 and 6. The base of the device is inserted between the ring and the patient's finger as above described, and the handle assembly is moved towards the lever assembly. Actuation of the switch means activates the motor to rotate both saw blades 100 and 102 which are located to both contact the ring. This cuts the ring in two places simultaneously. Such simultaneous cutting will define a gap that can may be large enough in and of itself to permit removing the ring even from a severely swollen finger. However, if this is not sufficient, a device, such as a reverse tong device as disclosed in the Wieg patent can be used to widen the gap. The reverse tong device is inserted between the blades 100 and 102, and operated to move these blades apart against the bias of the spring 110 from the position shown in FIG. 5 to the position shown in FIG. 6. The keys 120 and 122 remain in the respective keyways so the second element remains drivingly connected to the first element and to the motor drive shaft.

However, since the blades are in contact with the ring ends since they have not been moved after the cutting process, as the blades are moved apart, they will pry the ring open. The additional element, the reverse tongs, is inserted between the blades and those blades need not be moved. Therefore the drawbacks associated with devices such as the Wieg device, are not present in the device of the present invention. The cutting element doubles as the prying element and there is no need to remove one element and insert a second element which, as above discussed, may be a source of discomfort to the patient. Still further, due to the presence of the base element 40 between the saw blades and the patient's finger, there is little likelihood that there will be any contact between the prying element and the patient's finger thereby further protecting the patient from discomfort.

It is understood that while certain forms of the present invention have been illustrated and described herein, it is not to be limited to the specific forms or arrangements of parts described and shown.

I claim:

1. A device for removing rings from fingers comprising:
   (A) a handle assembly which includes
      (1) a handle element having a longitudinal axis,
      (2) a blade covering hood element mounted on one end of said handle element,
      (3) a pivot means on said handle element adjacent to said hood element, and
      (4) a motor mounted on said hood element and including a motor drive shaft which extends into said hood element;
   (B) a lever assembly mounted on said handle assembly adjacent to said hood element and including
      (1) a body connected to said pivot means to pivot toward and away from said handle element and having a body handle located adjacent to said handle assembly handle element, a base element located adjacent to said hood element, and a neck connecting said lever assembly handle to said base element and being pivotally connected to said pivot means so that said base element and said hood element move toward and away from each other when said lever assembly handle and said handle assembly handle element are moved toward and away from each other;
   (C) a saw means located in said hood element and connected to said motor to be rotatably driven thereby about an axis of rotation for cutting a ring on a finger to separate that ring so it can be removed from the finger, said saw means including
      (1) an extendable mounting means connected to said motor means to be driven thereby,
      (2) two saw blade elements mounted on said extendable mounting means to be movable toward and away from each other to separate a ring after that ring has been cut by said saw blade elements,
      (3) a first element on which a first saw blade of said two saw blades is fixedly mounted and which includes a bore and a keyway defined thereon to be adjacent to said bore, and
      (4) a second element on which the second saw blade of said two say blades is fixedly mounted and which includes a first key on one end thereof which is received in said first element keyway to drivingly connect said first and second elements together, and a second key on another end thereof, said motor drive shaft having a bore defined therein and extending from one end thereof toward said motor said motor drive shaft including a keyway extending along said motor drive shaft bore, said extendable mounting means second element second key being received in said motor drive shaft keyway and drivingly connecting said second element to said motor drive shaft;
   (D) rechargeable power supply means in said handle assembly handle element;
   (E) switch means on said handle element;
   (F) means connecting said motor to said power means via said switch means;
   (G) switch activating means on said lever assembly for activating said switch means when said lever assembly handle and said handle assembly handle element are moved toward each other;
   (H) charging means connectable to said power supply means to charge said power supply means; and
   (I) a spring having one end thereof attached to said second saw blade and a second end thereof connected to said hood element and biasing said second saw blade away from motor and towards said first saw blade.

2. The device defined in claim 1 wherein said rechargeable power means includes a rechargeable battery and said handle assembly includes a battery chamber.

3. The device defined in claim 2 wherein said charging means includes a wall supportable mount and means for connecting said charging means to said battery.

4. The device defined in claim 3 wherein said wall supportable mount includes a base for supporting said handle assembly handle element.

5. The device defined in claim 4 wherein said wall supportable mount includes an indicator for indicating that said battery is being recharged.

* * * * *